United States Patent
Herman et al.

(10) Patent No.: US 6,412,861 B1
(45) Date of Patent: Jul. 2, 2002

(54) BEVERAGE HOLDER WITH ANTI-SPILL PROTECTION

(76) Inventors: Corey Herman; Zachary Herman; Marc Herman, all of 800 Woodbury Rd., Woodbury, NY (US) 11797

( * ) Notice: Subject to any disclaimer, the term of this patent is extended or adjusted under 35 U.S.C. 154(b) by 35 days.

(21) Appl. No.: 09/205,079

(22) Filed: Dec. 4, 1998

(51) Int. Cl.[7] .............................................. A47B 39/00
(52) U.S. Cl. ...................... 297/146; 108/25; 248/311.2
(58) Field of Search ............................ 297/146, 188.01, 297/188.14, 188.04; 108/25, 26; 248/311.2

(56) References Cited

U.S. PATENT DOCUMENTS

| | | | |
|---|---|---|---|
| 1,967,898 A | * 7/1934 | Nilson | 248/311.2 X |
| 2,532,244 A | * 11/1950 | Pasmore | 248/311.2 X |
| 3,908,877 A | 9/1975 | Kosisky | |
| 4,795,211 A | * 1/1989 | Stern et al. | 248/311.2 X |
| 4,836,602 A | 6/1989 | d'Almada Remedios et al. | |
| 4,863,134 A | * 9/1989 | Young et al. | 248/311.2 |
| 4,972,781 A | * 11/1990 | Montgomery et al. | 108/25 |
| 5,060,899 A | * 10/1991 | Lorence et al. | 248/311.2 |
| 5,092,652 A | 3/1992 | Macaluso | |
| 5,234,251 A | * 8/1993 | Ayotte | 248/311.2 X |
| 5,601,268 A | * 2/1997 | Dunchock | 248/311.2 |
| 5,711,503 A | * 1/1998 | Mitchell, Sr. | 248/311.2 |
| 5,765,736 A | * 6/1998 | Fischer et al. | 248/311.2 X |

* cited by examiner

Primary Examiner—Peter M. Cuomo
Assistant Examiner—Stephen Vu
(74) Attorney, Agent, or Firm—Gordon & Rees, LLP; Marc E. Hankin

(57) ABSTRACT

A beverage holder for use in vehicles that prevents beverages placed within the holder from spilling. The beverage holder includes a tray and drink well housed within the tray. Additionally, the tray may have a pivot member mounted to it which connects the tray to a beverage guard. The beverage guard may be moved in a range of positions so that it completely covers the drink well and also leaves the drink well free for a cup to be placed within. The beverage guard is slightly larger than the size of the drink well and can be rotated to cover the drink well when a cup or glass has been placed within it. When not in use, the beverage guard may be moved in a position not covering the drink well.

15 Claims, 2 Drawing Sheets

BEVERAGE HOLDER WITH ANTI-SPILL PROTECTION

BACKGROUND OF THE INVENTION

The present invention relates to a beverage holder used in passenger vehicles, particularly to a beverage holder with anti-spill protection.

Most passenger vehicles utilize beverage holders of some type. This includes anything from a compact car to an airplane. All modes of vehicular transportation necessarily involve vibration and accompanying jarring movement of the vehicle which can cause a beverage placed in a beverage holder to spill. This occurs quite often in airplanes, boats or trains where beverages are often served out of cups or glasses rather than in a can or an open ended container with a special lid.

One type of beverage holder is described in U.S. Pat. No. 5,092,652 issued on Oct. 30, 1990. This beverage holder is part of a folding table used in the back of airplane seats and comprises two drink wells with ledges which support cups of various sizes. While the cups may fit into the drink wells, this tray is not adequate in preventing beverages from spilling over the edge of a cup when airplane turbulence acts up because there are no means to prevent the liquid contained in the cup from spilling when jarred.

A foldable tray that can also hold beverages and books is described in U.S. Pat. No. 4,972,781 issued on Nov. 27, 1990. This foldable tray has several openings wherein beverages may be placed. Cups placed in these openings are supported from beneath by a crossbar which supports the tray. This tray is not well adapted for use in vehicles because it is intended to be placed on a large flat surface making it more susceptible to movement. Containers placed in this tray may jostle within the circular openings and spill their contents. Moreover, the support means adds unwanted additional complexity to the tray and it also interferes with leg room.

Beverage holders may also be integrated within passenger seatbacks as is described in U.S. Pat. No. 4,836,602 issued on Jun. 6, 1989. This apparatus permits storage of sealed beverage cans within the seatback of a chair, such as those found on airplanes. Cups containing beverages cannot be stored in this configuration because of the horizontal storage method employed.

Another type of beverage holder is described in U.S. Pat. No. 3,908,877 issued on Feb. 12, 1974. This beverage holder is made up of a generally circular tray which has several drink wells evenly spaced around an inner radius of the tray. The tray has legs which permit the holder to be placed on a surface when filled with cups and a writing surface. These components are geared towards the invention's goal of increasing the ease of serving beverages when utilizing the beverage holder. This beverage holder is not well suited for passenger vehicles and their vibrations because the tray could easily tip over and further, there is nothing to cover the top portion of any beverages being transported.

In view of the above, it should be appreciated that there still is a need for a beverage holder with a movable spill guard permitting coverage of a beverage container in a drink well when conditions require. The present invention satisfies these long felt needs and provides other further related advantages.

SUMMARY OF THE INVENTION

The present invention is embodied in a beverage holder that includes a tray with at least one drink well. The drink well can be circular or polygon shaped so long as it is proportioned to receive a cup. Additionally, the tray can be outfitted with a pivot member connecting a beverage guard to it. The beverage guard is connected to the tray by the pivot member in such a manner as to allow it to move and cover the drink well. The beverage guard may be engaged to cover the drink well when a cup is placed within the drink well so as to prevent the contents of the cup from spilling. When not in use, the beverage guard may be moved to a position where it does not cover any portion of the drink well.

Other features and advantages of the present invention will become apparent from the following description of the preferred embodiments, taken in conjunction with the accompanying drawings, which illustrate, by way of example, the principles of the invention.

DETAILED DESCRIPTION OF THE PREFERRED EMBODIMENT

Figure 1:
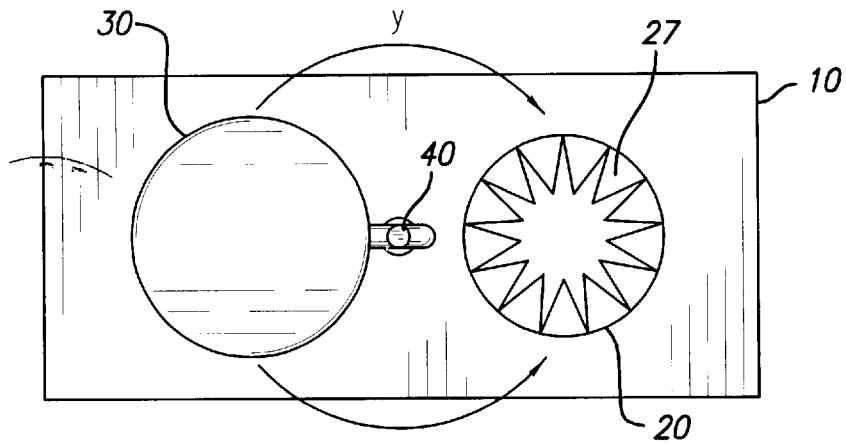
FIG. 1 is a top view of a beverage holder installed in a tray.
Figure 1A:
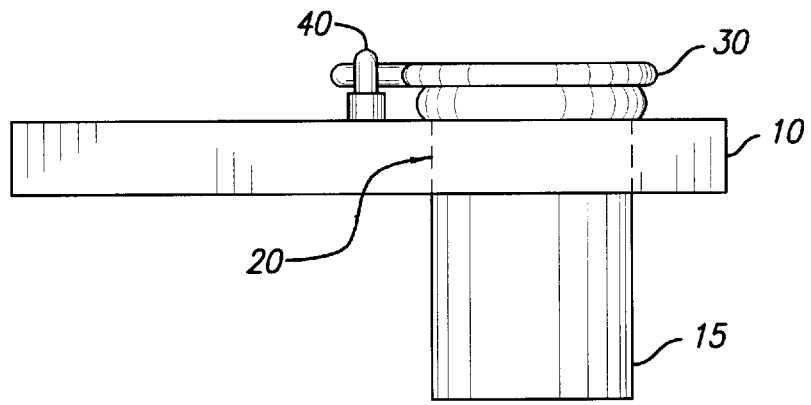
FIG. 1A is a side view of a beverage holder in use.

As shown in the accompanying drawings, particularly FIGS. 1 and 1A, the present invention is embodied in a generally flat surface, here a flat tray 10 (which may be rectangular), wherein a drink well 20 has been cut out of the tray and passes through the top and bottom surfaces of the tray. The tray table is preferably molded with a hollow plastic core to provide a durable and lightweight structure. The drink well is generally circular and has a diameter slightly smaller than the greatest diameter of an accompanying cup 15, though it is recognized that triangular, square, or other polygons and irregularly shaped cut-outs may be utilized to hold a cup. The cup is preferably the size of commercial cups typically utilized at present on passenger airplanes (see FIG. 1A). The diameter of the drink well can be tailored to fit a particular cup or may be of a size wherein varying size cups may be placed. The drink well may be a straight hole or it can be tapered such that the diameter on the bottom side of the tray is smaller than the diameter on the top side of the tray. Either configuration may also be lined with strips of rubber 27 thus permitting cups of various sizes to be placed within (similar to an in-sink garbage disposal).

A pivot member is attached to the top side of the tray 10, and in the preferred embodiment, consists of a pivot pin 40. While the lower side of the pivot member is attached to the tray, the upper side is attached to a beverage guard 30. As seen in FIGS. 1 and 1A, the beverage guard is generally circular in shape and is slightly larger than the circumference of the drink well. It is recognized that the beverage guard may be polygon shaped or irregularly shaped so long as it can cover the drink well.

The tray 10 of the beverage holder receives the cup 15 in the drink well 20 while the beverage guard 30 is in a position not covering the drink well. If vehicular vibrations or air turbulence become great, the beverage guard may be rotated radially around said pivot pin 40 in a plane parallel to the tray in direction y, to cover the top of the cup, as seen in FIG. 1A. Conversely, when there is little movement in the vehicle, the beverage guard may be rotated away from the cup allowing the cup to be easily removed from the drink well. It is also possible that a removable lid may be used in addition to the beverage guard. Preferably, the removable lid is shaped so as to fit on and seal to the upper lip of a cup.

Figure 2:
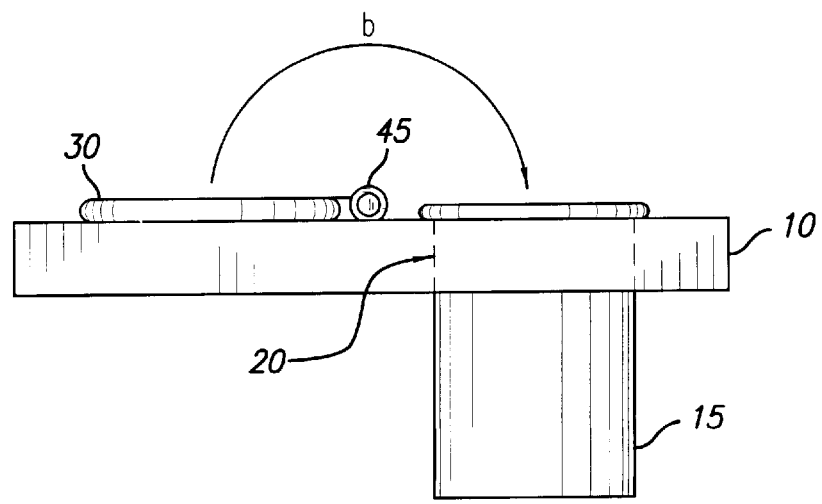
FIG. 2 is a side view of a beverage holder with a simple hinge in use.

While the preferred embodiment describes a beverage holder which utilizes a pivot pin to move the beverage guard 30, it is recognized that the pivot member may be made from other connection means. For example, as seen in FIG. 2, a pivot member employing a hinge 45 could connect the beverage guard 30 to the top surface of the tray 10. When not in use, the beverage guard would lay against the tray or at a height slightly above (depending on the height of the hinge above the tray) and could be radially rotated in a plane perpendicular to the tray to a point where the beverage guard covers the drink well 20.

Figure 3:
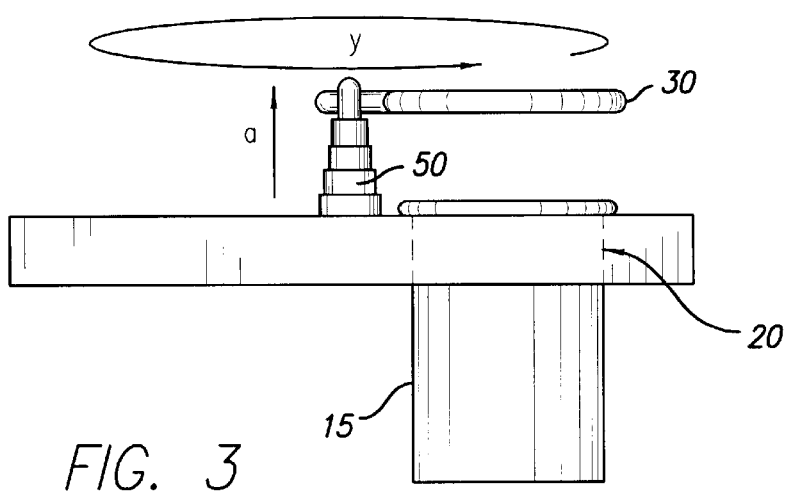
FIG. 3 is a view of a beverage holder with a telescoping pivot member in use.

In another embodiment, seen in FIG. 3, a beverage holder with a pivot member utilizes a telescoping pivot pin 50. This type of pivot member permits the beverage guard 30 to move radially around the telescoping pivot pin in a plane approximately parallel to the tray 10 (indicated by direction y), but it also permits the beverage guard to be raised and lowered in relation to the tray (indicated by direction a). This permits cups 15 of differing sizes to be placed into the drink well 20 and to be protected from spilling by raising or lowering the beverage guard. In this embodiment, and the others permitting the beverage guard to variably move in distance above the tray, the pivot member can also be biased towards the tray insuring that the beverage guard remains against the top of the cup when in a closed position.

Figure 4:
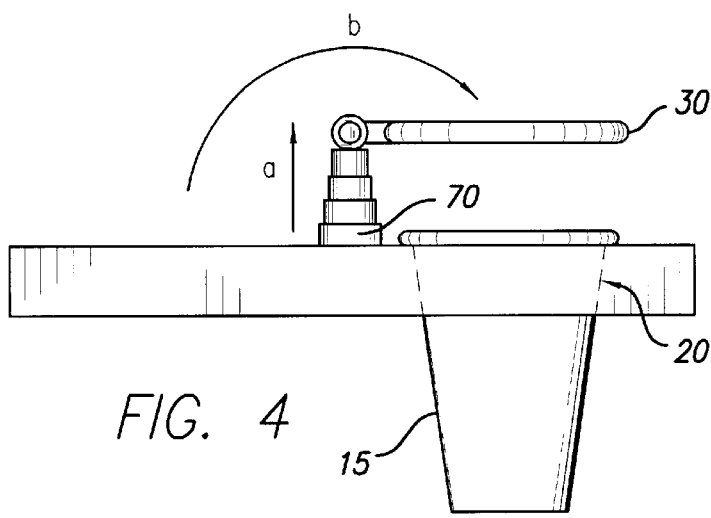
FIG. 4 is a side view of a beverage holder with a bidirectional hinge in use.

Another embodiment of the pivot member would allow the beverage guard 30 to move in two directions, a and b, as seen in FIG. 4. This embodiment would require a bidirectional hinge 70 which would permit vertical motion and circular motion perpendicular to the tray 10. Unlike the previous embodiments where the beverage guard was rotated around the pivot member, here the beverage guard is flipped from the tray (or a height slightly above the tray) to a space over the drink well 20. The ability of the bidirectional hinge to move in two directions permits cups 15 of differing sizes to be placed in the drink well and covered when necessary.

Figure 5:
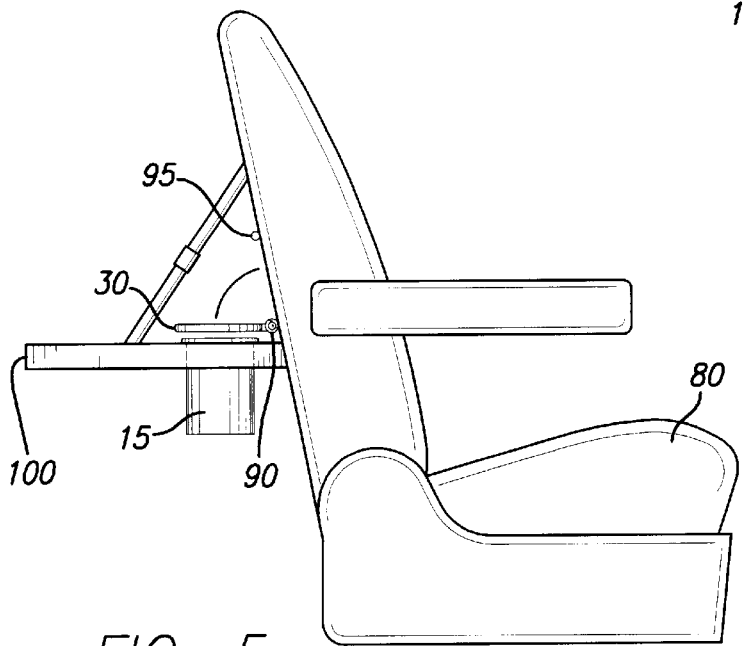
FIG. 5 is a side view of a beverage holder with a beverage guard mounted to a chair in use.

Yet another embodiment as seen in FIG. 5 is specifically tailored for travel in airplanes or trains where the beverage holder is part of a stowable tray 100 mounted on the seatback of a chair 80 as is well known in the art. Here the beverage guard 30 is independently mounted from the tray on the chair by means of a stop hinge 90. When attached to the beverage guard and the chair, the stop hinge allows the beverage guard to be moved to a position approximately parallel to the tray. The lowered position of the beverage guard in this embodiment may be limited either by a stop in the supporting stop hinge or by the beverage guard resting on the top of the cup 15 placed in the drink well or the tray. When not in use, the beverage guard may be rotated such that it is touching the back side of the chair and can be fastened by a latch 95 to prevent it from falling down. When the beverage guard is in a position covering the drink well with a cup placed within, there is a lesser likelihood that the jarring movements which necessarily accompany vehicular travel will cause any liquid contained within the cup to spill. In addition, any of the various pivot member embodiments may be utilized as part of this seatback beverage holder and any drink wells utilized may be tapered so as to permits cups of varying sizes to be placed within.

While the invention has been described in connection with a preferred embodiment, it will be understood that it is not intended to cover all modifications and alternative constructions falling within the scope of the invention as expressed in the appended claims.

What is claimed is:

1. A beverage holder comprising a tray with top and bottom sides;

at least one drink well housed in said tray;

a beverage guard; and a pivot member mounted on said top side of said tray connecting said beverage guard to said tray, allowing said beverage guard to move around said pivot member and positioned to permit said beverage guard to move and completely cover said drink well.

2. The beverage holder of claim 1 wherein said drink well is approximately circular.

3. The beverage holder of claim 1 wherein said drink well is polygon shaped having at least three sides.

4. The beverage holder of claim 1 wherein said drink well is tapered such that a diameter of said drink well on the bottom side of said tray is smaller than the diameter of said drink well on said top tray.

5. The beverage holder of claim 1 wherein said pivot member comprises a hinge.

6. The beverage holder of claim 1 wherein said pivot member comprises a pin.

7. The beverage holder of claim 1 wherein said beverage guard is biased towards said tray.

8. The beverage holder of claim 1 wherein said drink well is lined with strips of rubber.

9. The beverage holder of claim 1 wherein said pivot member is adjustable in height permitting variable spacing between said beverage guard and said top tray.

10. The beverage holder of claim 1 wherein said pivot member further comprises a bidirectional hinge allowing circular motion in a first plane parallel to the tray and linear motion in a second plane perpendicular to the tray.

11. The beverage holder of claim 1 wherein said pivot member further comprises a bidirectional hinge allowing circular motion in a plane perpendicular to the tray and linear motion in the same plane perpendicular to the tray.

12. A system for preventing a drink from spilling comprising:

a tray with top and bottom sides;

at least one approximately circular drink well housed in said tray;

a beverage guard;

a pivot member mounted on said top side of said tray connecting said beverage guard to said tray and allowing said beverage guard to move around said pivot member and positioned to permit said beverage guard to move and completely cover said drink well; and a cup to be placed in said drink well.

13. The system for preventing a drink from spilling in claim 12 wherein said cup has an extended lip on an upper portion larger than a diameter of said drink well.

14. The system for preventing a drink from spilling in claim 12 wherein said cup is tapered.

15. The system for preventing a drink from spilling in claim 12 further comprising a lid shaped so as to fit on and seal to an upper lip of said cup.

* * * * *